A. E. FOGELQUIST.
PIE CUTTER.
APPLICATION FILED FEB. 8, 1922.
1,418,868. Patented June 6, 1922.
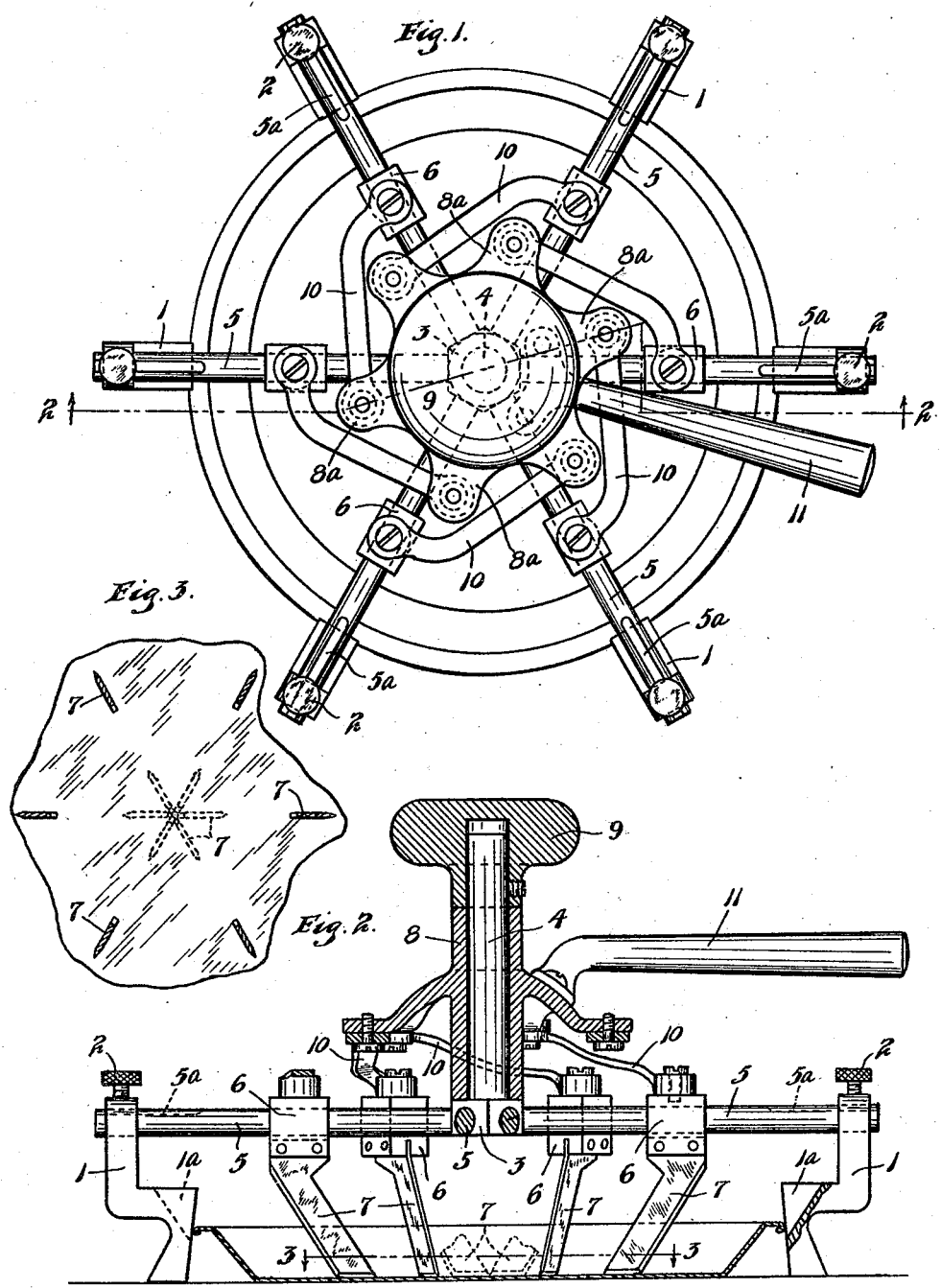
INVENTOR.
ALEX E. FOGELQUIST.
BY HIS ATTORNEY.
James F. Williamson

UNITED STATES PATENT OFFICE.

ALEX E. FOGELQUIST, OF MINNEAPOLIS, MINNESOTA.

PIE CUTTER.

1,418,868. Specification of Letters Patent. Patented June 6, 1922.

Application filed February 8, 1922. Serial No. 535,060.

*To all whom it may concern:*

Be it known that I, ALEX E. FOGELQUIST, a citizen of the United States, residing at Minneapolis, in the county of Hennepin and State of Minnesota, have invented certain new and useful Improvements in Pie Cutters; and I do hereby declare the following to be a full, clear, and exact description of the invention, such as will enable others skilled in the art to which it appertains to make and use the same.

This invention relates to a device for cutting pies or similar articles in a plurality of pieces preferably of equal size. At the present time, an exceedingly large number of pies are used and in some hotels and restaurants certain employees do nothing else but cut pies. To cut a pie with a single knife takes considerable time and the pieces are, furthermore, very often of unequal size.

It is an object of this invention, therefore, to provide a device, by means of which a pie can be easily and quickly cut into a plurality of pieces preferably of the same size.

It is a further object of the invention to provide such a device comprising a plurality of radially movable blades.

It is a more specific object of the invention to provide the device with supporting means arranged to contact the outer edge of a pie or pie plate and hold the same while the radially moving blades are moved through the pie.

It is still another object of the invention to provide a device having such pie pan or pie plate engaging means adapted to be moved to various positions to suit different sizes of pie containers and to further provide a single handle lever for moving all of the cutting blades.

These and other objects and advantages of the invention will fully appear from the following description made in connection with the accompanying drawings in which like reference characters refer to the same parts throughout the different views and in which, Fig. 1 is a plan view of the device showing the same applied to a pie pan;

Fig. 2 is a vertical section taken on the line 2—2 of Fig. 1; and

Fig. 3 is a fragmentary horizontal section taken on the line 3—3 of Fig. 2.

Referring to the drawings, the device comprises a plurality of circumferentially arranged legs or supporting means 1. As shown in the drawings, these legs are of angular shape and their lower front portions have surfaces substantially vertical or slightly inclined inwardly at their upper portions. The outer vertical portion of the arms are formed with horizontal and cylindrical apertures, and set screws 2 shown as having knurled heads are threaded into the top of the members and adapted to project downwardly into said apertures. A central member 2 is provided shown as of hexagonal shape and a spindle 4 is rigid therewith and projects upwardly therefrom. From the head 3, an arm or rod 5 shown as of cylindrical shape, extends rearwardly outward to each of the legs 1 and passes through the aperture therein. The outer end of these arms, at their top portion, are provided with grooves 5ª and the inner ends of the set screws 2 are adapted to seat in said grooves. The legs 1 are thus prevented from rotating on the rods 5 and by loosening the set screws 2 the legs 1 can be moved radially inwardly or outwardly on said rods.

Slidably mounted on each of the rods 5 is a block 6 which has depending centrally thereof a thin blade 7. These blades, as shown in Fig. 2, are inclined inwardly and are provided on their bottom and outer sides with sharp edges. The legs 1 are provided with vertical slots 1ª at their inner portions to accommodate the extreme outer position of the blades 7 and it is to accommodate the outer movement of the blocks 6 that the said legs are made of angular shape. A head 8 is rotatably mounted on the spindle 4 and rests on the member 3. This head is held in proper position on said spindle by a central handle or crank member 9 having an enlarged smooth head thereon and being bored to fit over the top of the spindle 4 to which it is secured by a suitable set screw. The head 8 has a downwardly and outwardly flange portion from which project radial lugs 8ª and a link 10 having an outer curved end, as shown in Fig. 1, is pivotally connected to the underside of each of the lugs 8ª and pivotally connected at its outer end to the top of one of the blocks 6. A handle member 11 is suitably secured to the top of the flange of member 8 for the purpose of rotating the same.

In operation, the device will be held in the left hand and the lever or handle 11 swung in a counter-clockwise direction to bring the knives or blades 7 to their inner or central position, at which time they will occupy the position shown by dotted lines in Fig. 3. The device will now be placed over a pie pan containing a pie in the manner illustrated in Fig. 2. Preferably, the handle 11 should be substantially opposite the operator at this time. As the device is placed down over the pie, the blades 7 will cut therethrough and through the bottom crust and rest in contact with the top surface of the pie pan. The handle 9 is now firmly gripped and the lever 11 swung toward the operator. This movement moves the block 6 and legs 7 outwardly through the pie. The lower edges of the blades move in close contact with the pie pan and the pie is thus quickly and evenly cut. As the blades 7 reach the outer edge of the bottom of the pan, the device is raised slightly and the handle 11 still moved. This causes the blades to continue to move outwardly and upwardly along the beveled sides of the pan and to the extreme upper edge thereof, and then over the top surface of said edge, if there be one. The pie will thus be cut to its extreme outer portions and each piece will be entirely separated from the other. The device is made of sufficient height so that the blocks 6 will clear the top of the pie and the blades 7 will have their outer edges inclined substantially at the same angle as the sides of the pie pan. The operation of the device is quite rapid and a great number of pies can be cut in an exceedingly short time. The device has been amply demonstrated in practice and is very efficient for the purpose intended.

It will be noted that the parts of the device are quite simple and are made of rugged construction. There is no tendency for the device to become disarranged or out of order. The parts of the device can be readily cleaned and the same kept in a very sanitary condition. The device will further be made of non-corrosive material or plated with such a material, so as not to be acted upon by the materials used in making the pie.

The device, as illustrated, is arranged to cut a pie into six pieces, but it will be obvious that the same can be made with a greater or less number of knives to cut the pie into as many pieces as desired. As stated, also, the members 1 can be moved to suit various sizes of pie pans, which pans are now made in several different sizes.

It will, of course, be understood, that various changes may be made in the form, details and proportions of the parts without departing from the scope of applicant's invention, which, generally stated, consists in the matter shown and described and set forth in the appended claims.

What is claimed is:

1. A device for cutting pies or similar articles comprising a plurality of radially disposed blades movable from the center of the pie outwardly to the edge thereof in radial planes.

2. A pie cutter having in combination a plurality of thin blades mounted for movement in substantially vertical radial planes from a central point, and means for simultaneously moving said blades.

3. A pie cutter having in combination a supporting frame, a plurality of blades mounted thereon, for radial movement outwardly from a central point, and lever means for simultaneously moving said blades.

4. A device for cutting pies or similar articles comprising a plurality of cutting means mounted to move in radial planes from the center to the outer edge of the pie.

5. A pie cutter having in combination, means for surrounding and holding a pie pan, a plurality of blades supported by said means and mounted for movement in vertical radial planes from the center of said pan, guiding means for said blades, and means for simultaneously moving said blades.

6. A pie cutter having in combination a plurality of blades mounted for movement in substantially radial planes from a central point, guiding means for said blades and rotating means connected to said blades for moving the same.

7. The structure set forth in claim 6, and a handle for moving said rotating means.

8. A pie cutter having in combination a plurality of circumferentially arranged means adapted to surround and contact with the edge of a pie pan, a plurality of blades movable in substantially vertical radial planes from the center of the pie outwardly, a handle means for holding said device in position and a rotating handle means for moving said blades.

9. A pie cutter having in combination a plurality of circumferentially arranged supports adapted to surround a pipe pan and engage the outer edge of the same, a central member, arms extending therefrom to each of said supports, blade carrying blocks slidable on said arms, a revolvable head mounted on said member, a swinging link extending from said head to each of said blocks, and means for rotating said head to slide said blocks and blades radially.

10. The structure set forth in claim 9, a central stationary handle disposed above said head, and said means comprising a rotatable handle projecting from said head for rotating the same.

11. A pie cutter having in combination a plurality of radially adjustable and circumferentially arranged means adapted to surround and contact the pie pan, a plurality of guide means extending inwardly therefrom, knife carrying means movable on said guide means and rotatable lever means for moving said knife carrying means radially.

In testimony whereof I affix my signature.

ALEX E. FOGELQUIST.